June 28, 1966     K. R. DENNICK     3,257,867
INFINITELY VARIABLE REVERSIBLE ALTERNATING CURRENT DRIVE
Filed Dec. 5, 1963     2 Sheets-Sheet 1
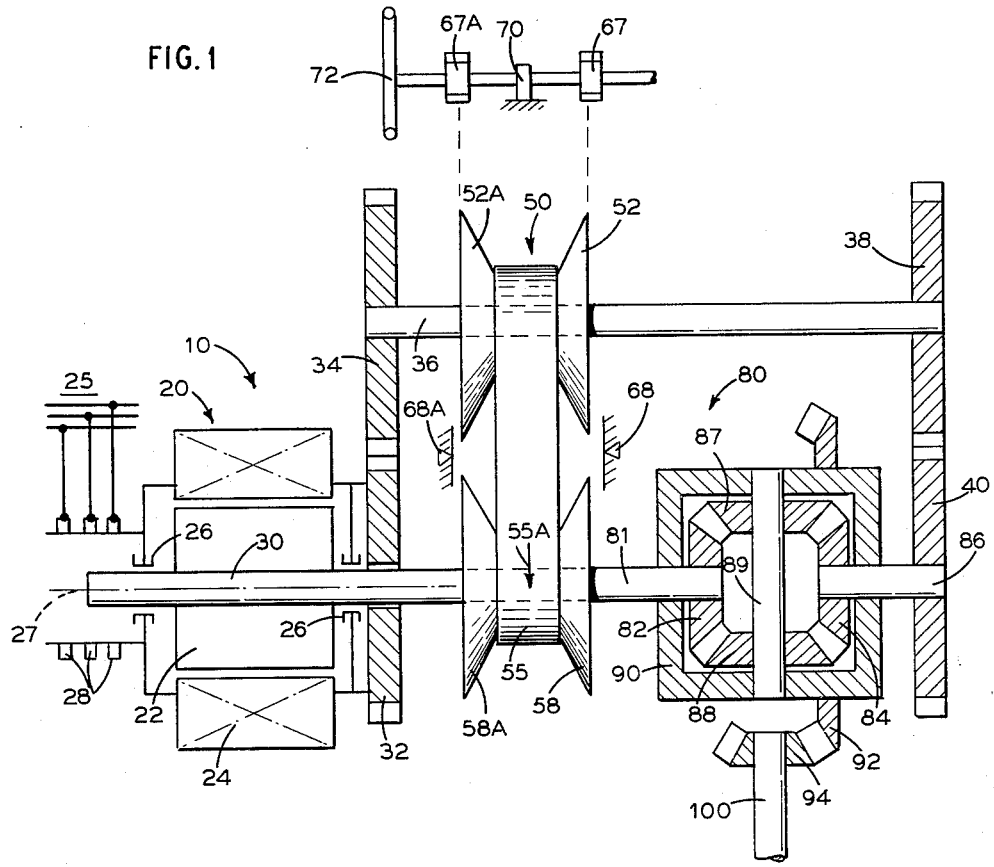
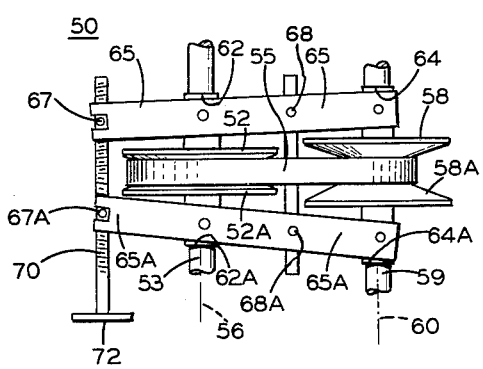
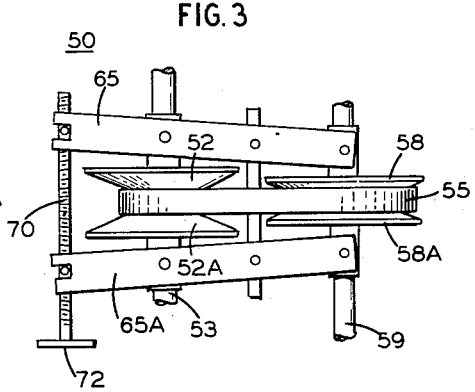
*INVENTOR.*
Kenneth R. Dennick
BY
ATTORNEY June 28, 1966  K. R. DENNICK  3,257,867
INFINITELY VARIABLE REVERSIBLE ALTERNATING CURRENT DRIVE
Filed Dec. 5, 1963  2 Sheets-Sheet 2

INVENTOR.
Kenneth R. Dennick
BY
*Irving Seidman*
ATTORNEY

United States Patent Office 3,257,867
Patented June 28, 1966

3,257,867
INFINITELY VARIABLE REVERSIBLE ALTERNATING CURRENT DRIVE
Kenneth R. Dennick, 1161 York Ave., New York, N.Y.
Filed Dec. 5, 1963, Ser. No. 328,228
16 Claims. (Cl. 74—689)

This invention relates to an infinitely variable and reversible alternating current drive. There are some applications in which it is desirable to change the direction of rotation of a load shaft, and also to change the rate of rotation or speed in each direction.

A primary object of this invention is to provide speed-change mechanism that can be infinitely variably controlled to develop an output variable speed in either direction, although said speed is derived from an electric motor operating in one fixed direction at a relatively constant speed.

Another object of the invention is to provide an infinitely-variable reversible-drive system in which an alternating current electric motor is utilized that operates in one relative direction at relatively constant speed.

Another object of this invention is to utilize an alternating current motor with both members supported for individual rotation, so that the speed of the motor is represented by the relative differential speed of the two relatively moving members, separately rotating, and in then controlling the individual speeds of those two separately rotating members so that the differential or difference speed between these two individual speeds can be utilized to operate an external load member at a desired speed in either direction.

Another object of the invention is to utilize a commercial form of mechanism for changing the speed ratio between two rotating shafts while maintaining the total accumulated speeds of the two shafts relatively constant at some predetermined value.

Another object of the invention is to provide a variable speed system utilizing a differential gear mechanism for controlling a desired output speed to a load.

Another object of the invention is to provide a variable speed system utilizing a set of output gearing to a load, with means for controlling variations in an output speed to, and within, the limits defined by the back-lash in the output gears.

Another object of the invention is to provide a variable speed system, powered by a motor at a relatively constant speed, with gearing between the motor and an output shaft operating to hold the adjusted speed of the output shaft within certain limits of variation controlled by the back-lash of the gearing and the torque of the motor.

The present invention utilizes the two usual members of an electric motor, such as a rotor and a stator, but arranged and supported to be individually rotatable, with those two motor members disposed and arranged to drive an epicyclic gearing, in one modification, or the two input gears of a differential, in a second modification, to derive an output speed for a load shaft.

In the differential modification an output gear is controlled so it can be driven in either direction, at a speed controlled by the difference between two input speeds impressed upon the input gears of the differential. By externally controlling those two input speeds, as derived from the two motor members, to the two input gears of the differential, the output speed from the differential can be variably adjusted to any desired speed value in either direction of rotation.

The two individual speeds of the two respective motor members are controlled in a novel combination with a speed-reducing transmission of a type that is commercially available. These transmissions are available in several forms. In one form, the transmission comprises two shafts, upon each of which is mounted a pair of conical wheels provided with radial teeth. Each pair of wheels is disposed with the two surfaces facing each other, in toothed alignment, and splined on the shaft to permit axial movement of the two toothed wheels, to control the riding level of a linked belt in its radial distance from the shaft axis. The two pairs of conical wheels are simultaneously controlled, the wheels of one pair being moved closer together while the wheels of the other pair are correspondingly separated, in order thereby to vary the equivalent radial distance of the riding level for the belt on those radial teeth, to thereby vary the effective diameter of each pair of conical wheels, as a gear, with respect to the other pair of wheels, as a gear, between which the linked belt is moving for its intended purpose.

As a result of such simultaneous adjustments of the two pairs of conical wheels, the speed ratio between those two sets of conical wheels and their related transmission shafts may be varied from a ratio of one to one, when both are at the same speed, to a speed ratio of, for example, six to one in one direction, or one to six in that same direction.

When the speed ratio between the two transmission shafts and their conical wheels is one to one, the speeds impressed by those two shafts upon the respective input gears of the differential mechanism will be equal, and the output speed from the differential will therefore be zero. As the speed ratio of the two transmission shafts is varied from a one-to-one ratio to a lower ratio in the direction of a one-to-six ratio, the two speeds impressed by those two shafts upon the two respective input gears of the differential will be in the same proportion of one to six, and the difference between those two input speeds will operate the differential gear to rotate the output, or load, shaft proportionately.

Inversely, if a ratio between the two sets of toothed gears is changed from one-to-one ratio to a six-to-one ratio, the speeds impressed upon the input gears of the differential mechanism will now be energized by speeds in a six-to-one ratio, and the differential gear will now be rotated in the opposite direction, according to the difference in speed between the two input speeds of the two input gears of the differential mechanism, and the output shaft will now be controlled by the differential mechanism and the related output gear, in a reverse direction, at a speed corresponding to the difference between the two input speeds on the input gears of the differential mechanism.

The system disclosed herein thus provides for direct drive from a motor to a differential mechanism with means for varying the ratio between the two speeds supplied from the motor to the differential mechanism, so that the output of the differential mechanism will provide power rotation at a selected differential output speed, either in a forward or in a reverse direction, thus providing for desired speed reduction from the speed of the uni-directional drive motor, and yet in either direction. By means of the gradual variation that is possible in the speed-changing transmission mechanism, that is infinitely continuously variable, the output speed drive of the differential mechanism may be varied from full desired speed in one direction, thru zero, to full desired speed in the opposite direction.

One of the features of the system herein, which can provide an output speed that is variably adjustable in either direction, is the balanced braking action on the output or load shaft at zero output speed. As is explained in the descriptive portion of the specification, this feature of balanced braking action at zero output speed, utilizes the full torque of the motor or other equivalent power source.

The manner in which the apparatus of the invention is constructed and operates, in both modifications, is shown and explained in the following specification, taken in connection with the accompanying drawings, in which FIGURE 1 is a functional, mechanical layout in diagram of a first modification embodying the invention, and utilizing a differential gear mechanism;

FIGURE 2 is a schematic mechanical arrangement showing the manner in which the speed-changing mechanism may be adjusted to establish a speed ratio in one ratio direction, from one-to-one; and FIGURE 3 is a view similar to FIGURE 2 with the mechanism arranged to vary the speed ratio in the opposite ratio direction, from one-to-one;

Figure 4:
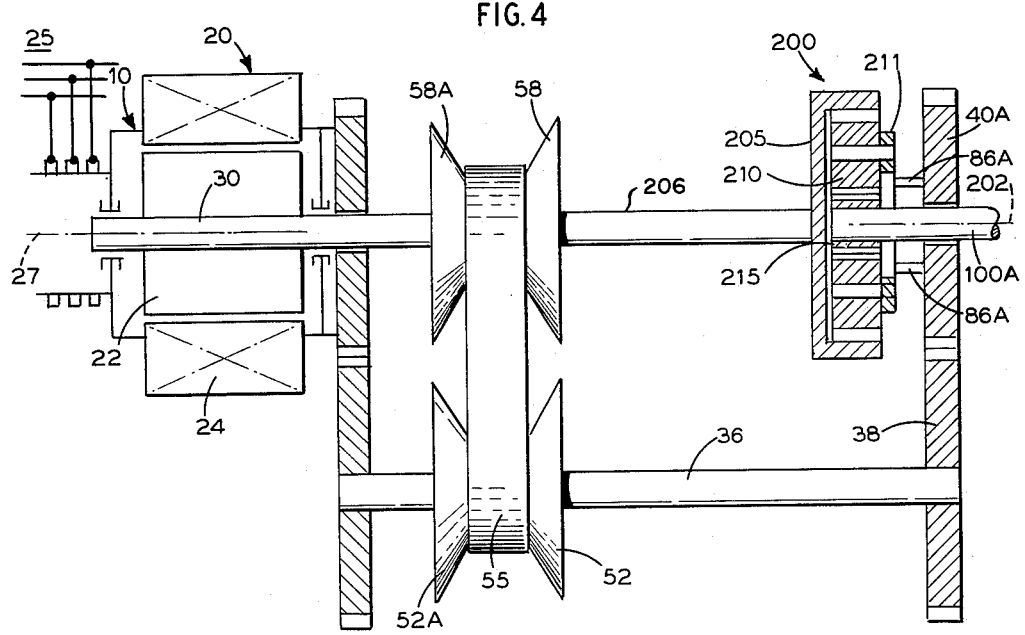
FIGURE 4 is a schematic functional diagram of the second modification embodying the invention, and utilizing a planetary gear system to the output.

As shown in FIGURE 1, one modification 10 of the variable speed system of this invention, comprises an electric motor 20 operating through a speed changer apparatus 50 to control a differential gear mechanism 80 for transmitting driving power to an output shaft 100 to an external load, at a selected speed in a desired direction of rotation of shaft 100.

The motor 20 is shown as functionally consisting of two members 22 and 24. The member 22 is usually referred to as the rotor, which is usually fixedly mounted on the rotatable shaft 30 of the motor. The part 24 of the motor in a usual conventional motor is the stator or armature, whose windings are energized through suitable slip rings 28 from an external circuit 25 controlled by suitable control equipment which need not be illustrated here.

For example, the motor 20 may be a synchronous motor, in which case the rotor would be a field structure with appropriate slip rings to conduct direct current to the field winding from an external source. Alternatively, the motor 20 may be an induction motor and the rotor a wound rotor or a squirrel-cage rotor. For the purpose of the present explanation, the motor 20 may be considered to be a squirrel cage motor.

For the purpose of this invention, the stator or armature 24 is suitably supported in bearings 26, to be independently rotatable relative to the rotatable rotor 22. The stator and the rotor rotate in opposite directions at a relative speed corresponding to the normal operating speed of the motor at that load.

Also, for the purpose of the present invention, it is preferable that the moment of inertia of the rotor 22 and its mechanically related mechanism, to be described below, be substantially equal to the moment of inertia of the armature 24 and its mechanically related mechanical parts, so that under normal conditions, when no external forces are applied, the two motor members 22 and 24 will tend to rotate at approximately equal speeds in opposite directions from a presumptive zero, neutral, or base, value.

In order to supply energy to the windings of the armature 24, three slip rings 28 are indicated on the rotatable structure of the armature 24 which rotates on bearings 26 about the common central axis 27 of the motor 20.

The motor shaft 30 is shown as functionally providing the driving speed to a first input gear 82 of the differential 80 through a first input shaft 81 of the differential 80, through a suitable coupling, not shown. The differential mechanism 80 also embodies a second input gear 84 mounted on a second input shaft 86 which rotates in a direction opposite to that of the first input shaft 81 for the first input gear 82, so proper operation of the differential mechanism 80 may be obtained.

The second input gear 84, of the differential mechanism 80, derives its driving power and speed from the armature 24 of the motor 20. For that purpose, the armature 24 drives a gear 32 to rotate a gear 34 secured on an auxiliary shaft 36 that is functionally arranged to drive a gear 38 which then drives a gear 40 mounted on the second input shaft 86 to the second input differential gear 84.

The use of the two gears 32 and 34 is to cause auxiliary shaft 36 to rotate in the same direction as the main shaft 30. In a like manner, the gear 38 is arranged to drive gear 40 to transmit driving energy to the second input shaft 86 and thus to the second input gear 84 in order to establish rotation of the second input gear 84 of the differential 80 in a direction opposite to that of the first input gear 82.

When the two input shafts 81 and 86 to the differential mechanism 80 rotate in opposite directions at the same speed, the related input gears 82 and 84 rotate two idler gears 87 and 88 which are supported for independent and free rotation on a supporting shaft 89. The shaft 89 is supported at both ends in opposite side walls of a housing 90 which serves to enclose the two input gears 82 and 84 and the two differential mitre gears 87 and 88, and to provide bearing support for the two input shafts 81 and 86 and for the two ends of the supporting shaft 89 for the two mitre gears 87 and 88.

When the two input gears 82 and 84 of the differential 80 rotate at the same speed but in opposite directions, the two differential mitre gears 87 and 88 ride freely on their supporting shaft 89, without impressing any transverse force on shaft 89.

However, when the two input gears 82 and 84 rotate at different speeds, the difference between those two speeds will cause the two differential mitre gears 87 and 88 to rotate with lever action around the slower of the two input gears, 82 or 84, and will react upon the supporting shaft 89 with a transverse force that will be transmitted to the housing 90, to cause rotation of the housing 90 around the common central axis 27, as indicated, for the shaft system. The rotation of the housing 90 is then utilized to rotate an associated output gear 92, which may be suitably coupled to a load gear 94, to drive the load shaft 100 in accordance with such differential speed from the differential mechanism 80. Output shaft 100 is thus driven in either direction, and according to the differential speed, as determined by the direction and relative speeds of the two input gears 82 and 84 of the differential mechanism 80.

Since the motor 20 which supplies the driving power, operates relatively in one direction only, the driving speed from the two members of the motor to the related input gears 82 and 84 of the differential, must be appropriately controlled to establish the desired output speed on the load shaft 100 in the direction of rotation desired in such load shaft 100. To achieve such speed control, the variable speed transmission 50 is utilized.

The variable speed transmission 50, shown schematically in its structural form, utilizes a construction that is conventional and commercially well known in the art. Its manner of application in this invention is different however.

In conventional use, the variable speed transmission 50 is operated directly in sequential arrangement between power source and load. Here, the variable speed transmission 50 is used as a speed-ratio changer to change the speed ratio between two shafts while keeping the sum of their speeds relatively constant.

The manner in which the speed-ratio changer 50 is operated is illustrated functionally in FIGURES 2 and 3.

In FIGURE 2 is shown a functional schematic arrangement of the various elements that enter into the construction and operation of the speed-ratio changer 50. As there shown, the speed-ratio changer 50 comprises a pair of radially grooved conical shaped wheels 52 and 52a, splined on a splined supporting shaft 53, so the two wheels 52 and 52a may be moved to closer relationship, as indicated, or moved axially to predetermined maximum separation, to accommodate a linked belt 55 at different radial distances, on the conical wheels 52 and 52a, from the central axis 56 of the splined supporting shaft 53.

A second pair of similar conical wheels 58 and 58a are similarly splined and supported on a splined shaft 59 to permit those two wheels 58 and 58a to be axially moved toward, or away from, each other, to provide a supporting position for the belt 55 on those two wheels 58 and 58a, at different adjusted levels, representing different radial distances on the two wheels 58 and 58a from the central axis 60 of the supporting splined shaft 59.

The arrangement of the two sets of radially grooved conical wheels 52 and 52a and 58 and 58a, respectively, is such that, as one set of wheels is gradually adjusted from minimum spacing to a maximum spacing, the other pair of wheels will be inversely controlled from a maximum spacing to a minimum spacing.

In order to establish such inverse action, the wheels 52 and 52a of one set are respectively supported on brackets 62 and 62a that are coaxially supported for axial movement on the shaft 53. The wheels 58 and 58a, of the other set, are respectively supported on brackets 64 and 64a, those brackets being similarly supported for axial movement on shaft 59, on suitable bearings to permit independent rotation of the shaft 59 with its two supported wheels 58 and 58a.

A lever 65 pivotally joins the two brackets 62 and 64 for the two wheels 52 and 58, and extends backward to a threaded control bracket 67 which is arranged to be laterally and adjustably moved to control the position of the lever 65. The lever 65 is also pivoted on a pivot bracket 68 so the pivot point for the lever 65 will be intermediate and equidistant from the pivot points on the two brackets 62 and 64. Thus, lateral movement on the adjusting bracket 67 will move the pivoted lever 65 to cause the brackets 62 and 64, with their supported wheels 52 and 58, to be moved axially through equal distances, but in opposite directions, on their respective shafts 53 and 59.

A second pivoted lever 65a is similarly pivotally connected between the two brackets 62a and 64a, and the lever 65a is pivotally supported on an intermediate bracket 68a. The lever 65a extends out to a bracket 67a which is suitably threaded and supported on an adjustable rod 70 that is provided with a hand wheel 72, or other equivalent means, for turning the threaded rod 70 to adjustably shift the positions of the two threaded brackets 67 and 67a to space those two pivoted brackets 67 and 67a more closely together or farther apart, according to the speed ratio desired between the two sets of conical wheels 52 and 58.

Continuing in FIGURE 2, when the two sets of wheels 52 and 52a, and 58 and 58a, are adjusted to their respective intermediate or neutral positions, and rotating power is supplied to either shaft 53 or 59, those two shafts 53 and 59 will rotate at the same speed. In that case, the power transmission belt 55 will be riding at a radial level, on the two sets of wheels, that will be of the same radius in both cases, and the two sets of wheels will therefore rotate in the same direction and at the same speed.

If, for example, in FIGURE 2, the set of wheels 52 and 52a were adjusted to minimum spacing and close position by the hand wheel control 72, the other set of wheels 58 and 58a would be separated to maximum spacing, as indicated, and the two sets of wheels would rotate as a pair of related gears driven by the belt 55, according to the radial distance of the belt 55, in its riding position, from the axis of the related shaft 53 or 59. Thus, as in the arrangement in FIGURE 2, rotation of either shaft 53 or 59 would cause the speed of wheels 52 and 52a to be low and the speed of wheels 58 and 58a to be high.

Assuming a possible speed-ratio change of six to one, with a shift from inner or low position of the belt to the outer or high position of the belt, of the respective wheels, the speed-ratio could be changed from one to six in the arrangement shown in FIGURE 2, to a ratio of six to one in an arrangement in which the wheels 52 and 52a were moved to their maximum separation, and the wheels 58 and 58a were moved to their minimum separation with close setting, as shown in FIGURE 3.

The operation of this ratio-changing mechanism may now be considered, in connection with FIGURE 1, to observe how the change in the speed-ratio serves to control both the output speed and the direction of rotation imparted to the output shaft 100 in FIGURE 1.

In the conventional use of the apparatus shown in FIGURE 2, the apparatus is used solely as a speed changer, between a power source and a load. One of the shafts supporting the two sets of conical wheels, for example shaft 53, is utilized as the input or power shaft, that is driven from a source of power, and the other shaft 59 serves as a load shaft, with a speed ratio between the two shafts controlled by the setting of the two sets of conical wheels which governs the setting of the transmission belt 55 on the respective two sets of wheels. Thus, the speed ratio may be changed to step up the output speed to a speed value that is greater than the input speed, or, on the other hand, the speed ratio may be reduced so the output speed will be less than or a fraction of the input speed. That is the conventional use of the transmission.

This ability to vary the speed ratio between the two sets of conical wheels is utilized in this invention, but in a different manner from that in which the speed reducer is utilized in conventional practice.

When the two sets of conical wheels 52 and 58, and the transmission belt 55, are adjusted to an intermediate position, as shown in FIGURE 1, with the speed ratio equal to one to one, it will be seen that the speeds of the two shafts 30 and 36 are equal and that they rotate both in the same direction. Consequently, the speed of the rotor 22 as transmitted through the shaft 30 onto the first input gear 82 of the differential 80 will be equal to and matched by the speed from the armature 24 that is transmitted through the gears 32, 34 and shafts 36, thence through gears 38 and 40 to the second input gear 84 of the differential mechanism 80. The two input differential gears 82 and 84 will therefore be operating at the same speed, although in opposite directions. Consequently, the intermediate mitre gears 87 and 88 will rotate freely on their supporting shaft 89, but will not have any tendency to roll on either of the input gears 82 or 84, and therefore will produce no transverse forces on the supporting shaft 89, to establish an output speed on load shaft 100.

Therefore, under the conditions as shown in FIGURE 1, the rotor 22 and the armature 24 of the motor 20 will be operating in opposite directions, each at the same absolute speed, but at a relative speed corresponding to the sum of those two absolute speeds, and such sum will represent the speed of the motor 20.

Thus, assuming a motor speed of 3600 revolutions per minute, the rotor will be turning in one direction at the speed of 1800 r.p.m., and the armature 24 will be rotating 1800 r.p.m. in the opposite direction. Thus, the speed impressed on the differential first input gear 82 will be 1800 r.p.m. in the same direction as the rotor 22. The speed impressed on the second differential input gear 84 will also be 1800 r.p.m., but in the opposite direction, due to the reversing effect of the two gears 38 and 40 serving to reverse the direction of the shaft 36 which is rotating in the same direction as the rotor shaft 30.

When the conical wheels of the speed ratio changer 50 are now adjusted to some other position, so that for example, the speed ratio from the shaft 30 to the shaft 36 is made two to one, the total relative motor speed will remain 3600 r.p.m., and similarly the total relative speed between the two sets of conical wheels 52 and 58 will remain 3600 r.p.m., but the individual speeds of those two sets of wheels 52 and 58, and of their respective supporting shafts 36 and 30, will be 1200 r.p.m. on shaft 36 and 2400 r.p.m. on shaft 30.

Consequently, shaft 30 will be driving the first input gear 82 of the differential 80 at a speed of 2400 r.p.m., while the shaft 36 will be driving the second input gear 84 of the differential 80 at a speed of 1200 r.p.m. The two differential mitre gears 87 and 88 will therefore be operated to roll on the slower second input gear 84 by the higher speed of the first input gear 82, with a consequent turning torque on the shaft 89 and housing 90 in a counterclockwise direction viewed from the second input shaft 86. The housing gear 92 will thereupon rotate the load gear 94 and the load shaft 100 in a clockwise direction, viewing the load shaft 100 from the lower end.

If now the speed-ratio gearing 50 is adjusted to establish the speed ratio in the opposite direction, with the rotor shaft 30 controlled by the conical wheels 58 to rotate at 1200 r.p.m., and with the armature shaft 36 controlled through two gears 32 and 34 from the armature 24 to rotate at a speed of 2400 r.p.m., the two input gears 82 and 84, of the differential 80, will now be rotating with first input gear 82 at 1200 r.p.m. in the direction indicated by the arrow 55a on the belt 55 of the speed ratio gearing 50, while the second input gear 84 will be rotating at a speed of 2400 r.p.m. in the opposite direction.

Now, the difference in speed between the differential input gears 82 and 84 is algebraically the sum total of 3600, corrsponding to the motor speed of the motor 20, but the difference in speed between the speeds of those two input gears 82 and 84, as measured by the differential mitre gears 87 and 88, is the arithmetical difference of 1200 r.p.m. Since the second input gear 84 is now rotating at a faster speed than the first input gear 82, the difference of 1200 r.p.m. will represent the effective tangential speed in r.p.m. in a clockwise direction around the second differential input shaft 86 as viewed from the outer end, with a corresponding application of 1200 r.p.m. tangentially on the gear teeth of the intermediate mitre gears 87 and 88, to cause a consequent movement of the housing 90 and the housing gear 92 in a clockwise direction viewed from the outer end of the input shaft 86. The housing gear 92 thereupon operates on the load gear 94 and the load shaft 100, to rotate the load shaft in a counterclockwise direction as viewed from the bottom of shaft 100.

Thus, by changing the speed ratio between the two sets of conical wheels 52 and 58, in one direction or the other, the speeds of the two shafts 30 and 36, as impressed upon the two input shafts 81 and 86 of the differential 80, control the relative speeds of those two input shafts 81 and 86 and their related input gears 82 and 84, with consequent control and variation of the speeds of the two input gears 82 and 84, so the difference in the speeds of those two input gears, and the relative direction of that difference in speed, can be imparted to the output load shaft 100.

The effective differential speed, corresponding to the arithmetic difference between the speeds of the two input gears 82 and 84 of the differential 80, will represent the speed impressed tangentially on the high speed side of the intermediate mitre gears 87 and 88. Those gears will essentially be rolling on the input gear of slower speed. Consequently, the effective speed impressed on the housing 90 and the housing gear 92 by those two mitre gears 87 and 88 will be only half of that differential speed due to the fact that the rolling movement of the intermediate gears 87 and 88 will be effective on their supporting shaft 89, which is midway between the effective point of application tangentially on the pitch circle of the teeth of the intermediate mitre gears 87 and 88 and the effective stationary rolling point of the intermediate mitre gears on the pitch line of those respective gears.

Thus, by variably adjusting the speed ratio between the two sets of conical wheels 52 and 58 of the speed-ratio gearing 50, from the one to one relationship as shown in FIGURE 1, to an increased or to a decreased speed ratio, the output speed at the shaft 100 may be varied from zero to a maximum speed, in either direction.

Thus, by the provision of a speed-ratio changer between a motor and a differential mechanism, the unidirectional motion derived from the motor may be converted selectively into a variable output speed, in either direction of rotation.

Thus, variable speed and reverse rotations may be easily obtained from a unidirectional motor by the simple arrangement for varying the relative input speeds to a differential mechanism, without varying the total effective speed of the motor.

Figure 5:
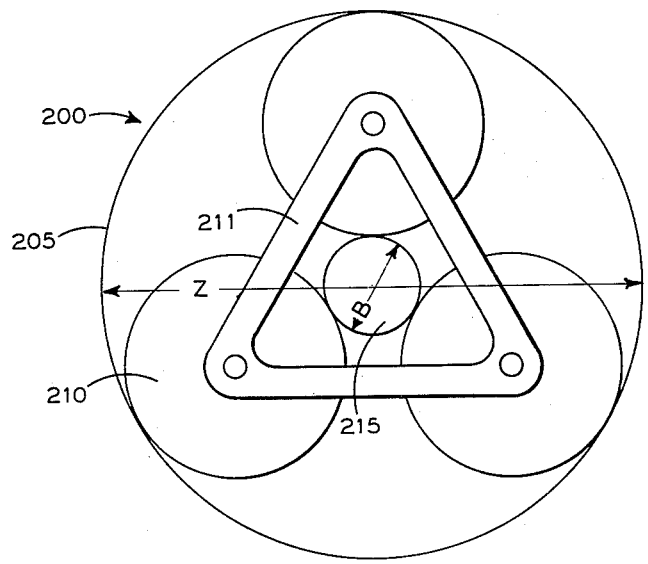
FIGURE 5 is a diagram showing the disposition of the gears in the planetary gear system.

The same general theory and general principles of operation apply in the second modification, shown in FIGURES 4 and 5, in which a planetary gear system 200 is employed instead of the differential mechanism 80 of the first modification as in FIGURE 1, except that the speed ratios must be different due to the different manner in which the planetary system functions.

As shown in FIGURE 4, all of the elements up to the planetary gears are identified by the same numerals as in FIGURE 1.

The planetary gear system 200 comprises an outer or ring gear 205, a planetary triple gear 210 and an inner gear 215. The ring gear 205 is a first drive gear and is connected to first input drive shaft 206 connected to rotor shaft 30 through conical wheels 58 and 58a.

The planetary triple gear 210 consists of three gears equi-angularly spaced about the central axis 202 of the planetary system and supported for individual rotation on a spider 211 with three spaced supporting pins. The spider 211 is driven by an external spur gear 40a which is, in turn, driven by a spur gear 38 on shaft 36 that supports and rotates with the set of conical wheels 52 and 52a. Spur gear 40a corresponds functionally to gear 40 of FIG. 1, but is here shown coupled to a cylindrical shaft 86a for supporting the spider for the three planetary gears 210. The inner gear 215 serves as the output gear, and is directly mounted on and secured to load shaft 100a.

The speed of inner gear 215 as output gear, may be determined as follows:

let $F$ = rotation of output inner gear 215, as a follower, per revolution of spider 211, equal to per revolution of spur gear 40a
$Z$ = diameter of ring gear 205 as a primary driver
$S$ = rotation of primary driver 205 per revolution of spider 211
$B$ = diameter of inner gear or follower 215
$F = 1 + Z(1-S)/B$ Assume $Z = 10$ pitch diameter of ring gear 205
$B = 0.75$ diameter of inner gear or follower 215

Then, for zero speed of the output shaft, $$F = 0 = 1 + 10(1-S)/.75$$

from which $S = 1.75$.

Therefore, for a motor speed of 1800 r.p.m., for example, the total per unit rotation is $1 + 1.075 = 2.075$, and $1800 \div 2.075 = 867$ r.p.m., for the primary driver or rotor speed, and $1800 - 867 = 933$ r.p.m., for the speed of the spider or gear 40a from shaft 36.

Upon reference to either modification, it will be realized that when the load shaft 100 is at zero speed, the system will be stabilized and held against change in speed of the load shaft in response to any external load forces, by the full torque of the motor 20 working as a reaction force against any such external load force applied to the output or load shaft 100.

Various changes or modifications may be made in the arrangement and disposition of the respective parts of the system without departing from the spirit and scope of the invention as set forth in the appended claims.

What is claimed is:

1. An infinitely variable-speed reversible-drive system comprising an alternating current uni-directional motor having a primary rotatable induction member supported for free rotation concentrically around a central axis, and a secondary rotatable induction member also supported for separate free rotation about said central axis and concentrically within said primary rotatable induction member;

a variable speed device having two parallel spaced shafts, with a pair of facing conical elements on each shaft, and with a movable coupling belt free to ride on both pairs of conical elements, and with means to adjustably vary the riding position of the belt on either or on both pairs of conical elements to adjustably vary the relative speeds of the two pairs of conical elements;

means coupling the primary rotatable induction member to one of said parallel spaced shafts and the secondary rotatable induction member to said second shaft, so that the two shafts of the variable speed device rotate in the same direction but at individual speeds according to the adjusted setting of the belt on each respective pair of conical elements, and at a total combined speed corresponding to the relative speeds of the two rotatable induction members of the motor;

a differential having two input shafts, an input gear on each input shaft, a housing, a housing shaft, intermediate idler gears on said housing shaft disposed in mesh between the two input gears, an external gear controlled by said housing as operated by said housing shaft; and an output shaft controlled by said housing gear.

2. An infinitely variable-speed reversible-drive motor system, comprising an alternating current motor having a primary member and a secondary member, both concentrically disposed about a common central axis, and having bearings to support said primary member and said secondary member for independent rotation, while maintaining a normal operating relative speed;

a differential gear mechanism having two input shafts each with a related input gear, an idler gear meshed with said two related input gears for differential operation, a housing supporting said idler gear and operable by said idler gear according to the relative direction of said input gears;

variable speed means having two variable speed shafts with means for mechanically and variably changing the speed ratio between said two variable speed shafts; and means for mechanically coupling each of the primary and secondary members, respectively, of the motor, to a separate one of the two variable speed shafts, and means for coupling each one of the two variable speed shafts, respectively, to a separate one of the two input shafts to the differential gear mechanism.

3. An infinitely variable-speed reversible-drive motor system, comprising a motor having a field member and an armature member concentrically disposed around a common axis and arranged to rotate independently, and at a relative speed representing the operating speed of the motor;

a first rotatable shaft connected to said field member, and a second rotatable shaft connected to said armature member and means for causing said first and said second shafts to be rotated in the same directions;

means mechanically coupling said first and said second shafts and operative to vary the speed ratio between said shafts while maintaining their combined total speeds equal to said operating speed of said motor; and a differential gear mechanism having two input gears respectively coupled to said first and to said second shafts for reverse rotation, and said mechanism having an output gear differentially coupled to said reversely rotating input gears; and an output shaft coupled to said output gear to rotate in a direction and at a speed that is a function of the motor speed and of the speed ratio setting of said speed ratio varying means.

4. A variable-speed reversible-drive motor system, comprising an electric motor having a first member and a second member electromagnetically coupled and arranged for independent rotation and for relative rotation in predetermined directions at relative speeds representing the operating speed of the motor;

a differential gear mechanism having a first and a second input gear to be rotated in opposite directions, a differential idler gear in mesh between said first and second input gears to be differentially responsive in speed and direction of rotation to the relative speeds of said first and second input gears, and an output gear driven by said differential idler gear;

means for mechanically coupling said first motor member to said first input gear and said second motor member to said second input gear to establish reverse rotation of said two input gears; and means for mechanically varying the speed ratio between the two coupling means from the motor members to the input gears of the differential gear mechanism while maintaining the relative speeds between said first and said second input gears equal to the operating speed of the motor.

5. A variable-speed reversible-drive electric motor system comprising an electric motor having a primary rotatable member and a secondary rotatable member, each supported for separate independent rotation and both operating in opposite directions at a relative speed representing the operating speed of the motor;

a differential gear mechanism having a first input gear and a second input gear with a differential gear in mesh between them, and an output gear responsive to differential movement of said differential gear;

two shaft means, one for coupling said primary rotatable motor member to said first input gear and a second including gearing for coupling said secondary rotatable motor member to said second input gear; and means coupled to said two shaft means for variably changing the speed-ratio between said coupling shaft means while maintaining the total combined speeds of said shaft means constant at said operating speed of the motor.

6. A variable-speed reversible-drive electric motor system, as in claim 5, in which said shaft means coupled to said two rotatable motor members are controlled to be rotated in the same direction so their total combined speeds equal the operating speed of said motor; and said speed-ratio changing means are effective to vary the individual speed of said shaft means while maintaining their total combined speeds at such operating speed of said motor.

7. A variable-speed reversible-drive system, comprising a first drive shaft;

a second drive shaft;

means for driving said first and second drive shafts so their total combined speeds add up to a predetermined total speed;

a differential gear mechanism having a first input gear, a second input gear, a differential gear in mesh between said two input gears, and an output gear driven by said differential gear;

means coupling each of said first and second drive shafts respectively to one of said first and second input gears, to drive said first and said second input gears in opposite directions; and means coupled to said first and said second drive shafts for varying the speed-ratio between said first and said second drive shafts, while keeping their total speeds substantially constant.

8. A variable-speed reversible-drive system, as in claim 7, wherein said means for driving said first and second drive shafts include a uni-directional electric motor having a rotor coupled to said first drive shaft, and having a rotatable stator type armature operatively coupled to said second drive shaft to drive said second drive shaft in the same direction as said first drive shaft.

9. A variable-speed reversible-drive system, as in claim 7, in which said means for varying the speed-ratio between said first and said second drive shafts comprises a first pair of radially grooved facing conical wheels splined on a first splined shaft;

a second pair of radially grooved facing conical wheels splined on a second splined shaft;

a toothed chain belt for fitting into the grooves of each pair of facing wheels; and means for variably spacing each pair of conical wheels to control the effective radial position of the chain belt on each pair of conical wheels.

10. A variable-speed drive system, comprising an electric motor having a primary member and a secondary member, each supported for independent rotation and both oppositely movable during normal motor operation to establish a relative or differential speed representing normal motor speed; and means including speed-changing means mechanically coupled to the primary and to the secondary members of the motor for controlling the individual respecitvely speeds of the primary and of the secondary motor members while leaving the relative or normal motor speed undisturbed.

11. A variable-speed drive system, as in claim 10, including means responsive to the respective individual speeds of said two motor members and operative to combine said two speeds to derive a difference output speed.

12. A variable speed system, comprising a motor having two members independently rotatable and rotatable relative to each other at a normal motor operating speed;

first and second shafts independently rotatable and respectively operated by means driven by said two motor members to turn in the same direction;

differential gear mechanism, having two input gears respectively driven by said first and second rotatable shafts, a differential gear in mesh between the two input gears and having also an output gear coupled to said differential gear to be rotatable at a speed and in a direction depending upon the speeds and the relative rotation of said two input gears as measured by said differential gear; and means for varying the individual respective speed of each of said two motor members without affecting the total relative speed between said two motor members.

13. A variable speed system as in claim 12, in which said speed-varying means includes a speed-change gear on each of said first and second shafts, and means for coupling the two speed-change gears to vary the speed ratio of said two speed-change gears while leaving their total speed unaffected.

14. A variable speed system, as in claim 13, in which each said speed-change gear on each of said first and second shafts consists of a pair of radially toothed conical wheels movably splined on the supporting first and second shaft respectively;

a chain belt mechanically rides on and couples the two pairs of speed change gears, and mechanically adjustable means serve to vary the spacing between the two conical wheels of each pair to shift the relative riding level of the chain belt on each such pair of conical wheels and thereby change the speed ratio between said two pairs and the shafts on which they ride.

15. A variable speed system, comprising two drive shafts;

means for driving said two drive shafts at speeds totaling a predetermined number;

speed-changing means for controlling said driving means to cause the ratio of said drive shaft speeds to be a selected number while maintaining their total speeds equal to said predetermined number;

and means driven from said two drive shafts for deriving an output speed equal to the difference between the two speeds of said two drive shafts.

16. A variable speed system, comprising two drive shafts;

means for driving said two drive shafts at speeds totaling a predetermined number;

speed-changing means for controlling said driving means to cause the ratio of said drive shaft speeds to be a selected number while maintaining their total speeds equal to said predetermined number;

and means driven from said two drive shafts for deriving an output speed equal to a function of the difference between the two speeds of said two drive shafts.

References Cited by the Examiner
UNITED STATES PATENTS

| | | | |
|---|---|---|---|
| 2,164,818 | 7/1939 | Heyer et al. | 74—689 |
| 2,168,071 | 8/1939 | Perry | 74—689 X |
| 2,175,551 | 10/1939 | Perry | 74—689 X |
| 2,219,184 | 10/1940 | Herman | 74—689 |
| 3,051,019 | 8/1962 | Seliber | 74—689 |
| 3,152,490 | 10/1964 | Lemieux | 74—689 X |

FOREIGN PATENTS 353,098  10/1937  Italy.

DAVID J. WILLIAMOWSKY, *Primary Examiner.*

DON A. WAITE, *Examiner.*

L. H. GERIN, *Assistant Examiner.*